Aug. 22, 1939.　　　　A. W. KLEINER　　　　2,170,246
BORING BAR HOLDER
Filed April 4, 1938
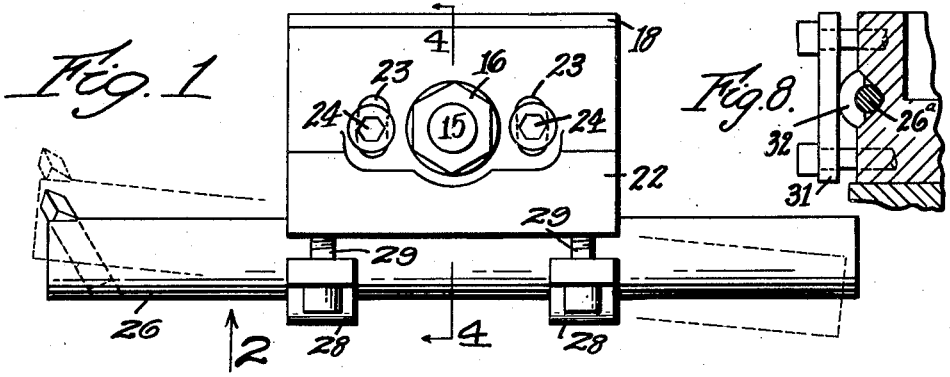
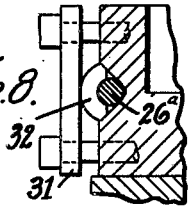
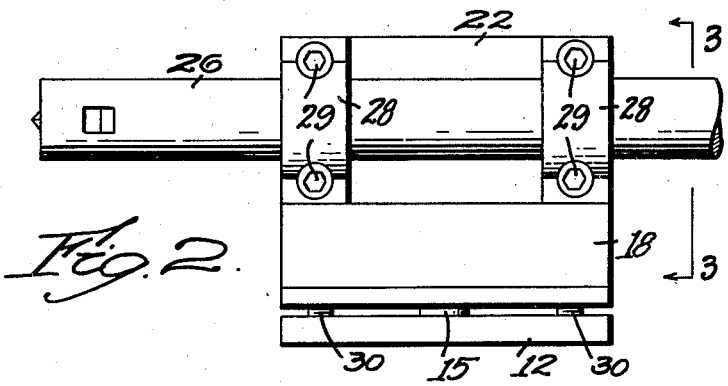
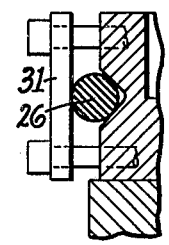
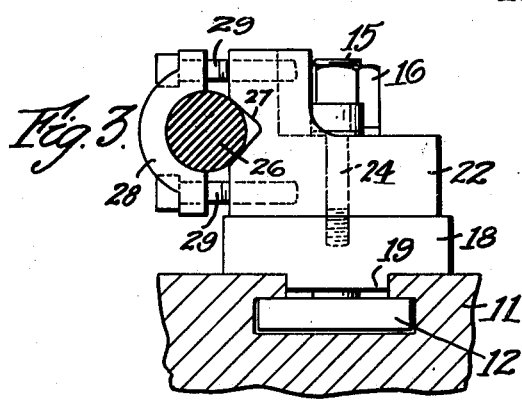
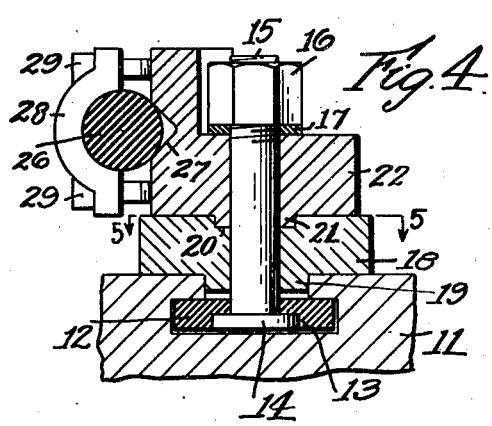
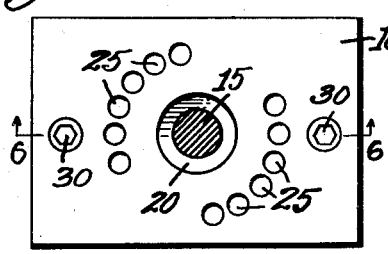
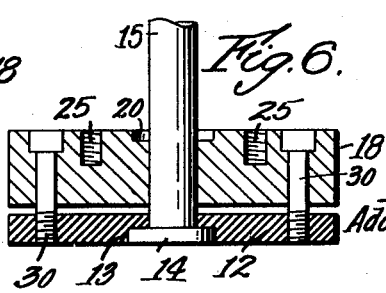
Inventor
Adolph W. Kleiner Patented Aug. 22, 1939

2,170,246

UNITED STATES PATENT OFFICE 2,170,246

BORING BAR HOLDER

Adolph W. Kleiner, Worcester, Mass.

Application April 4, 1938, Serial No. 199,874

1 Claim. (Cl. 82—36)

This invention relates to a holder for boring bars, and the like, to be applied to a lathe, or similar machine tool.

The principal objects of the invention are to simplify the means for holding a boring bar on a T-slot of a lathe, especially by eliminating the ordinary tool holder which is usually used in such a case; to provide such a holder in a convenient form for securely attaching it to a lathe bed having a T-slot, eliminating unnecessary features; to provide the holder in such form that the boring bar can be located at one side of it in convenient position where the stresses and strains can be adequately absorbed by the holder itself; and to provide means by which the boring bar can be fixedly located when desired at an angle to the main longitudinal dimension of the machine tool.

Other objects and advantages of the invention will appear hereinafter.

Reference is to be had to the accompanying drawing, in which

Fig. 1 is a plan of an ordinary boring bar supported in a holder constructed in accordance with this invention;

Fig. 2 is a side elevation of the holder;

Fig. 3 is a sectional view on the transverse line 3—3 of Fig. 2;

Fig. 4 is a sectional view on the line 4—4 of Fig. 1;

Fig. 5 is a plan view of the lower part of the holder, taken partly in section, on the horizontal line 5—5 of Fig. 4;

Fig. 6 is a sectional view on the line 6—6 of Fig. 5;

Fig. 7 is a view similar to Fig. 4 showing the use of this tool to support a much smaller boring bar, and Fig. 8 is a similar view showing its use for a boring bar so small that a clamping member has to be placed alongside of it.

This tool holder is intended to be mounted in the T-slot 10 of a table 11 of a machine tool, such as a lathe, or the like. For the purpose of holding it in this T-slot, there is placed in the slot a plate 12, which can be moved along the slot at will. This plate has a recess 13 in which is the head 14 of a vertical upwardly projecting bolt 15 adapted to be held down by a nut 16. Under the nut there is a washer 17 and it holds down in position a plate 18 which is provided with a circular projection 19 at the bottom to enter the top of the T-slot and with a similar recess 20 at the top for receiving a circular projection 21 on the boring bar holder 22.

It will be seen, therefore, that the boring bar holder can be held firmly in position by this bolt 15. The boring bar holder is provided with two curved slots 23 concentric with the bolt 15 through which bolts 24 pass into a pair of screw threaded holes 25 in the member 18.

It will be seen that there are several of these holes 25, one series on one side of the bolt and the other on the other to receive the two side bolts 24. By this means the boring bar holder 22 can be set at an angle to the longitudinal central line of the machine itself, as indicated in dotted lines in Fig. 1, without interfering with the rest of the apparatus or adjustments that have been made. This is for the purpose of bringing the boring bar 26 out of alignment with the central line of the machine tool. The plate 18 is held down to the plate 12 by a couple of bolts 30.

This boring bar is arranged to engage a longitudinal recess 27 in the edge of the holder 22 and it is also engaged by a cap 28 fixed to the holder by bolts 29. In this way the boring bar can be held firmly in position, either parallel with the longitudinal dimension of the machine tool or at an angle thereto, as shown in Fig. 1. It is firmly held in position and thus will avoid chattering. It is constructed of the smallest number of parts so that it will be comparatively inexpensive to make and there will be very little waste.

When this holder is to be used for a small boring bar this can be done without change, by substituting for the cap 28 a flat bar 31, as shown in Fig. 7, or, if a still smaller boring bar 26a is to be used, the same bar 31 can be employed, together with a sector-shaped collar 32. In either case the boring bar can be held firmly in position and the rest of the tool does not have to be modified enough to involve much expense.

Having thus described my invention and the advantages thereof, I do not wish to be limited to the details herein disclosed, otherwise than as set forth in the claim, but what I claim is:

A boring bar holder comprising a plate adapted to be centered over a T-slot and held with respect thereto, a boring bar holder resting on and centered on said plate, a bolt extending through the plate and boring bar holder for fixing the boring bar in position, a nut for the bolt, whereby, when the nut of said bolt is loosened the boring bar can be turned on the axis of said nut, said plate having in its upper surface two series of concentric screw threaded holes, one hole of each series being diametrically opposite one hole of the other series and two bolts extending through and supported by the boring bar holder and extending into any two of said holes which are located opposite each other to fix the boring bar holder in any angular adjusted position.

ADOLPH W. KLEINER.